(12) United States Patent
Bushnell et al.

(10) Patent No.: US 10,871,860 B1
(45) Date of Patent: Dec. 22, 2020

(54) FLEXIBLE SENSOR CONFIGURED TO DETECT USER INPUTS

(71) Applicant: Apple Inc., Cupertino, CA (US)

(72) Inventors: Tyler S. Bushnell, Mountain View, CA (US); Michael B. Wittenberg, Sunnyvale, CA (US); Devon A. Monaco, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/400,416

(22) Filed: Jan. 6, 2017

Related U.S. Application Data

(60) Provisional application No. 62/396,784, filed on Sep. 19, 2016.

(51) Int. Cl.
*G06F 3/044* (2006.01)

(52) U.S. Cl.
CPC .... *G06F 3/044* (2013.01); *G06F 2203/04102* (2013.01); *G06F 2203/04105* (2013.01)

(58) Field of Classification Search
None
See application file for complete search history.

(56) References Cited

U.S. PATENT DOCUMENTS

| | | |
|---|---|---|
| 5,212,356 A | 5/1993 | English |
| 5,541,372 A | 7/1996 | Baller |
| 5,748,177 A | 5/1998 | Baker et al. |
| 5,920,303 A | 7/1999 | Baker et al. |
| 6,029,214 A | 2/2000 | Dorfman et al. |
| 6,429,846 B2 | 8/2002 | Rosenberg et al. |
| 6,585,435 B2 | 7/2003 | Fang |
| 6,757,002 B1 | 6/2004 | Cross |
| 6,822,640 B2 | 11/2004 | Derocher |
| 7,339,577 B2 | 3/2008 | Sato |
| 7,364,337 B2 | 4/2008 | Park |
| 7,364,339 B2 | 4/2008 | Park |
| 7,538,760 B2 | 5/2009 | Hotelling |
| 7,683,890 B2 | 3/2010 | Geaghan |
| 7,834,855 B2 | 11/2010 | Hotelling et al. |
| 7,839,379 B1 | 11/2010 | Kerr |
| 7,843,438 B2 | 11/2010 | Onoda |
| 7,847,789 B2 | 12/2010 | Kolmykov-Zotov et al. |

(Continued)

FOREIGN PATENT DOCUMENTS

| | | |
|---|---|---|
| CN | 1862732 | 11/2006 |
| CN | 101071354 | 11/2007 |

(Continued)

OTHER PUBLICATIONS

Rekimoto, Jun, "Thumbsense: Automatic Input Mode Sensing for Touch-Based Interactions," Interaction Laboratory, Sony Computer & Science Laboratories, Inc., 2 pages, Apr. 2003.

*Primary Examiner* — Ifedayo B Iluyomade

(74) *Attorney, Agent, or Firm* — Brownstein Hyatt Farber Schreck, LLP

(57) ABSTRACT

A flexible sensor includes a compliant layer positioned between two substrate layers. The compliant layer includes a first compliant material and a second compliant material that is more deformable or compressible than the first compliant material. The flexible sensor can be bent, twisted, shaped, or otherwise manipulated at the section(s) of the flexible sensor that include the second compliant material.

19 Claims, 13 Drawing Sheets

(56) References Cited

U.S. PATENT DOCUMENTS

| | | | |
|---|---|---|---|
| 7,884,315 B2 | 2/2011 | Andre et al. | |
| 7,893,921 B2 | 2/2011 | Sato | |
| 7,999,792 B2 | 8/2011 | Tsuji | |
| 8,022,942 B2 | 9/2011 | Bathiche | |
| 8,063,893 B2 | 11/2011 | Rosenberg et al. | |
| 8,077,057 B2 | 12/2011 | Ohshita et al. | |
| 8,098,233 B2 | 1/2012 | Hotelling et al. | |
| 8,321,810 B2 | 11/2012 | Heintze | |
| 8,330,725 B2 | 12/2012 | Mahowald | |
| 8,334,794 B2 | 12/2012 | Watanabe | |
| 8,335,996 B2 | 12/2012 | Davidson et al. | |
| 8,378,975 B2 | 2/2013 | Yoon et al. | |
| 8,381,118 B2 | 2/2013 | Minton | |
| 8,390,481 B2 | 3/2013 | Pance et al. | |
| 8,432,362 B2 | 4/2013 | Cheng et al. | |
| 8,436,816 B2 | 5/2013 | Leung et al. | |
| 8,441,790 B2 | 5/2013 | Pance et al. | |
| 8,502,800 B1 | 8/2013 | Vier et al. | |
| 8,537,132 B2 | 9/2013 | Ng et al. | |
| 8,537,140 B2 | 9/2013 | Tsai et al. | |
| 8,570,280 B2 | 10/2013 | Stewart et al. | |
| 8,592,699 B2 | 11/2013 | Kessler | |
| 8,599,141 B2 | 12/2013 | Soma | |
| 8,642,908 B2 | 2/2014 | Moran et al. | |
| 8,654,524 B2 | 2/2014 | Pance et al. | |
| 8,686,952 B2 | 4/2014 | Burrough et al. | |
| 8,723,824 B2 | 5/2014 | Myers | |
| 8,743,083 B2 | 6/2014 | Zanone et al. | |
| 8,749,523 B2 | 6/2014 | Pance et al. | |
| 8,766,922 B2 | 7/2014 | Kim et al. | |
| 8,782,556 B2 | 7/2014 | Badger et al. | |
| 8,786,568 B2 | 7/2014 | Leung et al. | |
| 8,804,347 B2 | 8/2014 | Martisauskas | |
| 8,854,325 B2 | 10/2014 | Byrd et al. | |
| 8,859,923 B2 | 10/2014 | Obata | |
| 8,870,812 B2 | 10/2014 | Alberti et al. | |
| 8,952,899 B2 | 2/2015 | Hotelling | |
| 8,960,934 B2 | 2/2015 | Sung | |
| 8,963,846 B2 | 2/2015 | Lii et al. | |
| 9,019,207 B1 | 4/2015 | Hamburgen et al. | |
| 9,019,710 B2 | 4/2015 | Jeziorek | |
| 9,028,123 B2 | 5/2015 | Nichol et al. | |
| 9,063,627 B2 | 6/2015 | Yairi et al. | |
| 9,098,120 B2 | 8/2015 | Huh | |
| 9,098,244 B2 | 8/2015 | Roskind | |
| 9,104,282 B2 | 8/2015 | Ichikawa | |
| 9,116,616 B2 | 8/2015 | Kyprianou et al. | |
| 9,122,330 B2 | 9/2015 | Bau et al. | |
| 9,195,354 B2 | 9/2015 | Bulea et al. | |
| 9,201,105 B2 | 12/2015 | Iida et al. | |
| 9,213,426 B2 | 12/2015 | Clifton et al. | |
| 9,223,352 B2 | 12/2015 | Smith et al. | |
| 9,244,490 B2 | 1/2016 | Park | |
| 9,250,738 B2 | 2/2016 | Sharma | |
| 9,304,599 B2 | 4/2016 | Walline | |
| 9,317,140 B2 | 4/2016 | Rosenfeld | |
| 9,400,579 B2 | 7/2016 | Leung et al. | |
| 9,575,587 B2 | 2/2017 | O'Keeffe | |
| 9,635,267 B2 | 4/2017 | Lee et al. | |
| 9,640,347 B2 | 5/2017 | Kwan | |
| 9,753,569 B2 | 9/2017 | Han et al. | |
| 9,811,221 B2 | 11/2017 | Hayashi | |
| 9,908,310 B2 | 3/2018 | Niu | |
| 9,927,895 B2 | 3/2018 | Ligtenberg | |
| 10,114,485 B2 | 10/2018 | Su | |
| 10,146,383 B2 | 12/2018 | Leung et al. | |
| 10,241,255 B2 | 3/2019 | Zha | |
| 10,409,412 B1 | 9/2019 | Andre et al. | |
| 2004/0104894 A1 | 6/2004 | Tsukada et al. | |
| 2004/0257345 A1 | 12/2004 | Makanae et al. | |
| 2006/0109258 A1 | 5/2006 | Takisawa | |
| 2006/0197753 A1 | 9/2006 | Hotelling | |
| 2007/0076859 A1 | 4/2007 | Tzvetanov | |
| 2008/0018611 A1* | 1/2008 | Serban | G06F 3/045 345/173 |
| 2008/0055259 A1 | 3/2008 | Plocher et al. | |
| 2008/0100568 A1 | 5/2008 | Koch et al. | |
| 2008/0150903 A1 | 6/2008 | Chuang | |
| 2008/0272927 A1 | 11/2008 | Woolley et al. | |
| 2009/0128495 A1 | 5/2009 | Kong | |
| 2009/0225052 A1 | 9/2009 | Liu | |
| 2009/0284465 A1 | 11/2009 | Oki | |
| 2010/0033354 A1 | 2/2010 | Ejlersen | |
| 2010/0265183 A1 | 10/2010 | Mail et al. | |
| 2010/0271315 A1 | 10/2010 | Bathiche | |
| 2010/0279136 A1* | 11/2010 | Bonucci | H01L 31/048 428/519 |
| 2010/0283741 A1 | 11/2010 | Heintze et al. | |
| 2011/0001706 A1 | 1/2011 | Sanford | |
| 2011/0069021 A1 | 3/2011 | Hill | |
| 2011/0169749 A1 | 7/2011 | Ganey et al. | |
| 2012/0001852 A1 | 1/2012 | Ho et al. | |
| 2012/0050646 A1 | 3/2012 | Huang | |
| 2012/0068933 A1 | 3/2012 | Larsen | |
| 2012/0212443 A1 | 8/2012 | Tomimori | |
| 2013/0002534 A1 | 1/2013 | Braun et al. | |
| 2013/0002573 A1 | 1/2013 | Baba | |
| 2013/0021256 A1 | 1/2013 | Manzen | |
| 2013/0120259 A1 | 5/2013 | Piot et al. | |
| 2013/0126325 A1 | 5/2013 | Curtis et al. | |
| 2013/0215122 A1 | 8/2013 | McCollum | |
| 2013/0229350 A1* | 9/2013 | Shaw | G06F 1/1618 345/168 |
| 2013/0335329 A1 | 12/2013 | Freund | |
| 2014/0015755 A1 | 1/2014 | Hao | |
| 2014/0043289 A1 | 2/2014 | Stern et al. | |
| 2014/0208262 A1 | 7/2014 | Huang | |
| 2014/0317564 A1 | 10/2014 | Odell et al. | |
| 2014/0347312 A1 | 11/2014 | Siska | |
| 2014/0368455 A1 | 12/2014 | Croisonnier et al. | |
| 2015/0052473 A1 | 2/2015 | Kuscher et al. | |
| 2015/0097780 A1 | 4/2015 | Hotelling et al. | |
| 2015/0123906 A1 | 5/2015 | Mehandjiysky et al. | |
| 2015/0123907 A1 | 5/2015 | Aoki | |
| 2015/0205417 A1 | 7/2015 | Yairi et al. | |
| 2015/0223328 A1 | 8/2015 | Endoh et al. | |
| 2015/0283943 A1 | 10/2015 | Huebner et al. | |
| 2015/0293592 A1 | 10/2015 | Cheong et al. | |
| 2015/0297145 A1 | 10/2015 | Luna et al. | |
| 2015/0309589 A1 | 10/2015 | Chang | |
| 2016/0049266 A1 | 2/2016 | Stringer et al. | |
| 2016/0098107 A1* | 4/2016 | Morrell | G06F 3/044 345/173 |
| 2016/0103496 A1 | 4/2016 | Degner et al. | |
| 2016/0111485 A1* | 4/2016 | Chida | H01L 27/322 257/40 |
| 2016/0147440 A1 | 5/2016 | Leyon | |
| 2016/0231856 A1 | 8/2016 | Suwald et al. | |
| 2017/0033323 A1* | 2/2017 | Chida | H01L 51/0097 |
| 2017/0090594 A1 | 3/2017 | Silvanto et al. | |
| 2017/0090596 A1 | 3/2017 | Silvanto et al. | |
| 2017/0090597 A1 | 3/2017 | Silvanto et al. | |
| 2017/0090654 A1 | 3/2017 | Silvanto et al. | |
| 2017/0249072 A1 | 8/2017 | Martin et al. | |
| 2017/0315622 A1 | 11/2017 | Morrell et al. | |
| 2018/0011548 A1 | 1/2018 | Garelli | |
| 2018/0039351 A1 | 2/2018 | Zhu et al. | |
| 2018/0039376 A1 | 2/2018 | Peterson et al. | |
| 2019/0025954 A1 | 1/2019 | Wang et al. | |

FOREIGN PATENT DOCUMENTS

| | | |
|---|---|---|
| CN | 101482785 | 7/2009 |
| CN | 101609383 | 12/2009 |
| CN | 101644979 | 2/2010 |
| CN | 101675410 | 3/2010 |
| CN | 201563116 | 8/2010 |
| CN | 102171632 | 8/2011 |
| CN | 102200861 | 9/2011 |
| CN | 202166970 | 3/2012 |
| CN | 102844729 | 12/2012 |
| CN | 103164102 | 6/2013 |
| CN | 103176691 | 6/2013 |

(56) References Cited

FOREIGN PATENT DOCUMENTS

| | | |
|---|---|---|
| CN | 203260010 | 10/2013 |
| CN | 103384871 | 11/2013 |
| CN | 103425396 | 12/2013 |
| CN | 103455205 | 12/2013 |
| CN | 103577008 | 2/2014 |
| CN | 103914196 | 7/2014 |
| CN | 104423740 | 3/2015 |
| CN | 104834419 | 8/2015 |
| CN | 104915002 | 9/2015 |
| CN | 205038595 | 2/2016 |
| CN | 206147528 | 5/2017 |
| EP | 0189590 | 6/1986 |
| EP | 2305506 | 4/2011 |
| EP | 2664980 | 11/2013 |
| FR | 2980004 | 3/2013 |
| JP | 2001175415 | 6/2001 |
| TW | 200912612 | 3/2009 |
| TW | 201419112 | 5/2014 |
| WO | WO2007/032949 | 3/2007 |
| WO | WO2011/159519 | 12/2011 |
| WO | WO2014/124173 | 8/2014 |
| WO | WO2014/164628 | 10/2014 |

\* cited by examiner

US 10,871,860 B1

FLEXIBLE SENSOR CONFIGURED TO DETECT USER INPUTS

CROSS-REFERENCE TO RELATED APPLICATION(S)

This application claims the benefit under 35 U.S.C. § 119(e) of U.S. Provisional Patent Application No. 62/396,784, filed on Sep. 19, 2016, and entitled "Flexible Sensor Configured To Detect User Inputs," which is incorporated by reference as if fully disclosed herein.

FIELD

The described embodiments relate generally to a sensor in an electronic device that is configured to detect user inputs.

BACKGROUND

Electronic devices include many different electrical, mechanical, and structural components. One example of an electrical component is a sensor, such as a capacitive sensor that can be used to detect touch or force inputs applied to a surface of the electronic device. Different types of sensors can be positioned in a variety of locations within the electronic device. For example, a touch sensor can be situated adjacent a display to detect touch inputs applied to the display while a force sensor may be located in an input button to detect force inputs applied to the input button.

In some situations, the locations where a sensor can be positioned are limited by the shape of the electronic device, or by the dimensions of the open or accessible areas within the electronic device. For example, it can be challenging to position a larger-sized sensor in an electronic device due to the various physical components (e.g., electrical, structural, and mechanical components) within the electronic device. The shapes or dimensions of the physical components can interfere with the placement of the larger-sized sensor. In some instances, the dimensions of the physical components can hinder the performance of the sensor because the sensor cannot be placed in a more favorable location.

SUMMARY

Embodiments described herein relate generally to a flexible sensor that includes a compliant layer positioned between two substrate layers. The compliant layer includes a first compliant material and a second compliant material that is more deformable or compressible than the first compliant material. The flexible sensor can be bent, twisted, shaped, or otherwise manipulated at the section(s) of the flexible sensor that include the second compliant material.

In one aspect, a flexible sensor is configured to detect a user input, such as a force input. The flexible sensor includes a first flexible circuit comprising a first electrode and a second flexible circuit comprising a second electrode. The second electrode is aligned in at least one direction with the first electrode. The first and the second electrodes are configured to detect the force input based on a change in capacitance. A compliant layer is positioned between the first and the second flexible circuits. The compliant layer includes a compliant material and a gap positioned in a section of the compliant material. The gap allows at least one of the first or the second flexible circuits to bend, twist, or otherwise be manipulated at the section of the flexible sensor that includes the gap. A bonding structure is attached to the first and the second flexible circuits at a transition in the compliant layer between the compliant material and the gap. The bonding structure increases the resistance of the compliant material to a shear force.

In another aspect, an electronic device includes a physical component and a bendable sensor adjacent to and extending along a surface of the physical component. The physical component can be an electrical component, a mechanical component, and/or a structural component. The bendable sensor includes a compliant layer positioned between a first substrate layer and a second substrate layer. The compliant layer includes a first compliant material having a first spring constant and a second compliant material positioned in a section of the first compliant material and having a second lower spring constant. The first and the second substrate layers bend at the section of the bendable sensor that includes the second compliant layer to conform to a shape of the physical component. The bendable sensor further includes an input-sensing element coupled to one of the first substrate layer or the second substrate layer and configured to detect a user input. An example input-sensing element is an electrode that detects a user input based on capacitance changes between the electrode and a conductive object. Example conductive objects include, but are not limited to, a body part of a user (e.g., a finger) or an input device (e.g., a stylus with a conductive component such as a conductive tip).

In yet another aspect, a method of providing a flexible force sensor in an electronic device includes providing a compliant layer formed with a first compliant material and removing a section of the compliant material to produce an unfilled space in the compliant layer. The compliant layer is attached between a first flexible circuit comprising a first electrode and a second flexible circuit comprising a second electrode. The second electrode is aligned in at least one direction with the first electrode. The first and the second electrodes are configured to detect a force input based on a change in capacitance. The flexible force sensor is then positioned in the electronic device, where the flexible force sensor bends to conform to a surface of a physical component in the electronic device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
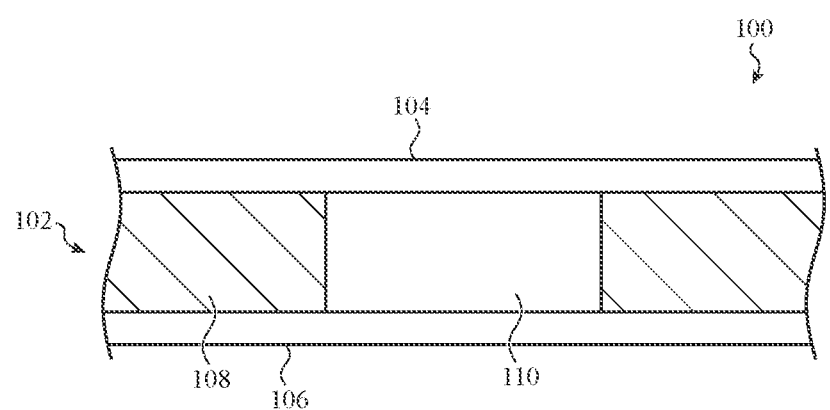
FIG. 1 depicts one example of a flexible sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a flexible sensor that is configured to detect user inputs, such as force inputs and/or touch inputs. The flexible sensor is also configured to be bent, twisted, shaped, or otherwise manipulated. For example, the flexibility of the sensor allows the sensor to be positioned at more favorable locations within the electronic device to improve the operation of the flexible sensor. In some instances, the flexible sensor may be bent to conform along a contoured surface, or to fit within the open or accessible areas, in an electronic device. A contoured surface includes any two sections of the surface (or more than two sections of the surface) that abut one another at a non-zero angle.

In some embodiments, the surface can be a surface of a component (e.g., physical, structural, mechanical) within an electronic device. In other embodiments, the component may be an object that interacts with (e.g., attaches to) an electronic device and the surface is a surface of the object. For example, the object may be a band that attaches to an electronic device and the flexible sensor can conform to the surface of the band (e.g., a watch and watchband). The watchband can include a flexible sensor that conforms to the shape of the watchband.

In a particular embodiment, a flexible sensor includes a compliant layer situated between two flexible circuits or substrate layers. The compliant layer is formed with a first compliant material and a second compliant material that is more deformable or compressible than the first compliant material. In some embodiments, the second compliant material comprises air or gaps that are formed within the first compliant material. The gaps permit at least one of the first or the second substrate layer or flexible circuit in the flexible sensor to bend, twist, or otherwise be manipulated. In some instances, the first compliant material is displaced into the gaps in response to a user input (e.g., a force input), which allows the flexible sensor to deform or compress at the sections that include the first compliant material.

Additionally or alternatively, the gaps may be formed at select locations in the first compliant material to influence the performance, or to produce a given performance, of the flexible sensor. The transitions between the first compliant material and the second compliant material permit the sensitivity and stiffness of the flexible sensor to be tuned to a given sensitivity and/or stiffness, or set within a given sensitivity range and/or stiffness range. Defining sections of the flexible sensor to have reduced stiffness can provide resistance to shear and/or provide improved contouring and bend performance.

In some instances, mechanical, electrical, and/or structural components can be nested in one or more gaps in the flexible sensor. For example, one or more electrical contacts and/or electrical components may be positioned in a gap and electrically connected to one or both substrate layers (e.g., flexible circuits). Example electrical contacts include, but are not limited to, test points, interconnects, and electrodes for capacitive sensing. The electrodes may be used to detect the bending, twisting, or manipulation of the flexible sensor.

A bonding structure may be attached to the first and the second flexible circuits or substrate layers. The bonding structure can increase the resistance of the first compliant material to shear forces when the flexible sensor is bent, twisted, or otherwise manipulated. Additionally or alternatively, the bonding structure may improve the contouring and bend performance of the flexible sensor.

These and other embodiments are discussed below with reference to FIGS. 1-16. However, those skilled in the art will readily appreciate that the detailed description given herein with respect to these Figures is for explanatory purposes only and should not be construed as limiting.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of an electronic component (e.g., a sensor), the directional terminology is intended to be construed broadly, and therefore should not be interpreted to preclude the presence of one or more intervening layers or other intervening features or elements. Thus, a given layer that is described as being formed, positioned, or situated on or over another layer, or that is described as being formed, positioned, or situated below or under another layer may be separated from the latter layer by one or more additional layers or elements.

FIG. 1 depicts one example of a flexible sensor. The flexible sensor 100 includes a compliant layer 102 positioned between a first substrate layer or flexible circuit 104 and a second substrate layer or flexible circuit 106. The compliant layer 102 includes a first compliant material 108 and a second compliant material 110. The second compliant material 110 is a different compressible or deformable material than the first compliant material 108. In some embodiments, the spring constant of the second compliant material 110 is less than the spring constant of the first compliant material 108. For example, in one non-limiting embodiment, the first compliant material 108 may be formed with silicone and the second compliant material 110 is an air gap in a section of the first compliant material 108. Insofar as the air is not constrained within the gap, the spring constant of the gap may be zero, or may be dependent only on the spring constants of the first and the second flexible circuits 104, 106.

The first and the second compliant materials 108, 110 can each be formed with any suitable compressible or deformable material(s). As one example, the first compliant material 108 is made of a polymer material (e.g., silicone) and the second compliant material 110 can be air. The section or sections of the compliant layer 102 that include air may be formed by removing a section of the first compliant material 108 to form a gap or a partial gap in the first compliant material 108.

In other embodiments, the first compliant material 108 is a polymer and the second compliant material 110 may be a gel or a foam that is more compressible or deformable than the polymer. Generally, one compliant material (e.g., the second compliant material 110) is more deformable or compressible than the other compliant material (e.g., first compliant material 108). The type of material used in the second compliant material 110 is based at least in part on the function of the flexible sensor (e.g., type of user input sensed) and the degree of manipulations (e.g., bends) in the flexible sensor 100. The material in the second compliant material 110 can differ when the first and second substrates 104, 106 in one flexible sensor 100 will be bent at a greater angle than the first and second substrate layers in another flexible sensor.

The flexible sensor 100 can be configured as any type of a user input sensor. An example user input sensor includes, but is not limited to, a touch sensor, a force sensor, a displacement sensor, and a proximity sensor. Accordingly, the user input sensor can include any suitable input-sensing element or elements that detect a user input through capacitance sensing, optical sensing, pressure sensing, resistive sensing, magnetic sensing, temperature sensing, and the like. For example, the input-sensing elements can be one or more electrodes, piezoelectric components, magnetic components, ultrasonic components, and/or optical components.

Figure 2A:
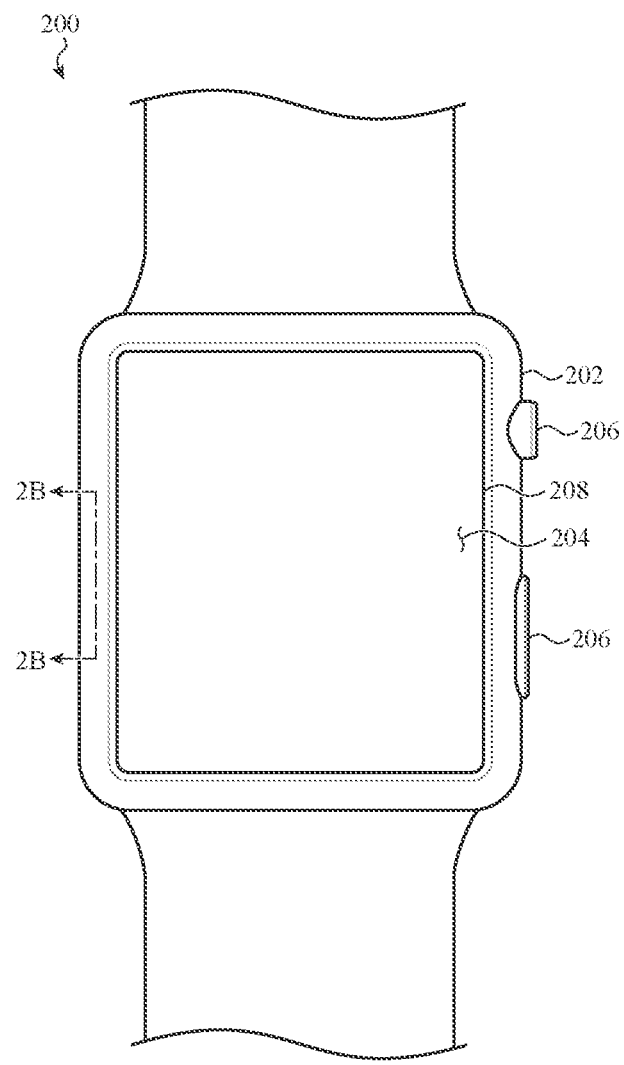
FIG. 2A shows an example electronic device that can include one or more flexible sensors.

FIG. 2A illustrates an example electronic device that can include one or more flexible sensors. The illustrated electronic device 200 is depicted as a wearable electronic device that may provide information regarding time, health, fitness, wellness, messages, video, operating commands, and statuses of externally connected or communicating devices and/or software executing on such devices (and may receive any of the foregoing from an external device). Other wearable electronic devices include, but are not limited to, glasses, fabrics and clothing, headphones, shoes, hats, and jewelry.

For example, one or more flexible sensors may be included in a strap or a band that is worn on a body part of a user (e.g., on the user's wrist). The flexible sensor is configured to adjust its shape so that the flexible sensor conforms to the shape of the band when the user is wearing the band and when the user is not wearing the band. Additionally, the flexible sensor is configured to adjust to changes in the shape of the band while the user is wearing the band. Such adjustments may permit the flexible sensor to remain operable regardless of the band's shape.

Additionally, a flexible sensor can be included in other types of electronic devices. For example, an electronic device can be a tablet computing device, a digital music player, a gaming device, a touchscreen, a remote control, a smart telephone, and any other suitable electronic device.

An enclosure 202 can form an outer surface or partial outer surface for the internal components of the electronic device 200. The enclosure 202 at least partially surrounds a display 204 and optionally one or more input/output (I/O) devices 206. The enclosure 202 can be formed of one or more components operably connected together, such as a front piece and a back piece. Alternatively, the enclosure 202 can be formed of a single piece operably connected to the display 204. The enclosure 202 can be formed of any suitable material, including, but not limited to, plastic and metal. In the illustrated embodiment, the enclosure 202 is formed into a substantially rectangular shape, although this configuration is not required.

The display 204 can provide a visual output to the user. The display 204 can be implemented with any suitable technology, including, but not limited to, a multi-touch sensing touchscreen that uses a liquid crystal display (LCD) element, a light emitting diode (LED) element, an organic light-emitting display (OLED) element, an organic electroluminescence (OEL) element, or another type of display element. In some embodiments, the display 204 can function as an input device that allows the user to interact with the electronic device 200. For example, the display can include a touch sensing device that allows the display to function as a multi-touch display.

In some embodiments, a cover layer 208 can be positioned over a top surface of the display 204 and the electronic device 200. The cover layer can be a transparent cover layer when the cover layer is positioned over the display (or the portion of the cover layer overlying the display may be transparent). The cover layer 208 may be made of any suitable material, such as glass, plastic, or sapphire.

In some embodiments, the electronic device can include one or more flexible sensors that are each configured to detect user inputs. Example user inputs include, but are not limited to, touch and/or force inputs. A flexible sensor or sensors can be positioned over, below, and/or around the display 204, in or below the I/O devices 206, below the cover layer 208, and/or below the enclosure 202.

Figure 2B:
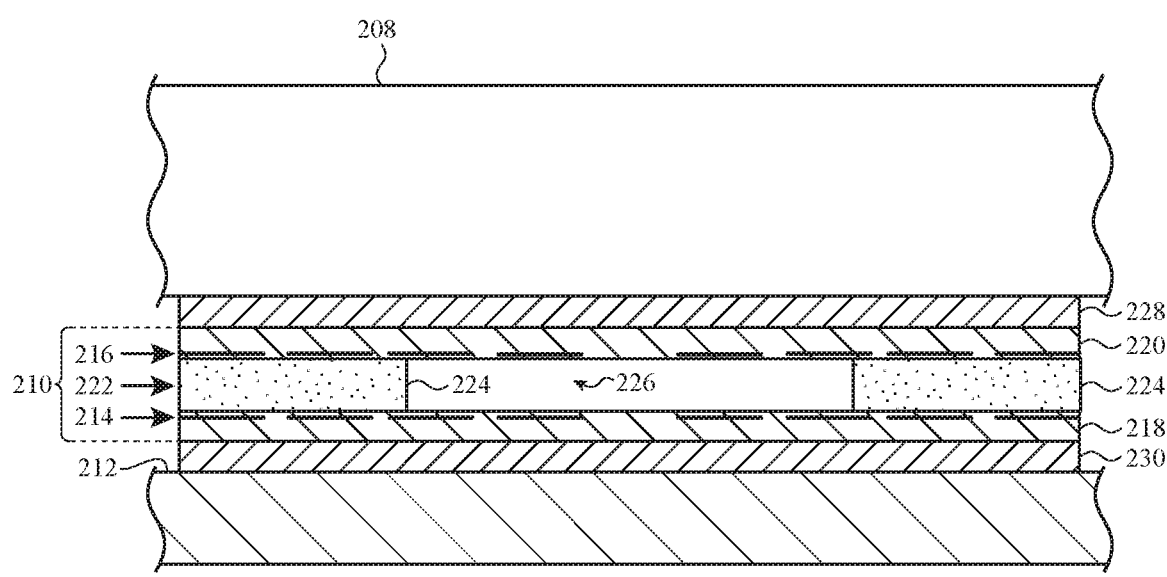
FIG. 2B depicts a cross-sectional view of the electronic device taken along line 2-2 in FIG. 2A.

FIG. 2B shows a cross-sectional view of the electronic device taken along line 2-2 in FIG. 2A. In the illustrated embodiment, a bendable or flexible sensor 210 is positioned between the enclosure 202 (FIG. 2A) and the cover layer 208. In particular, the flexible sensor 210 rests on a ledge 212 of the enclosure 202. The ledge 212 extends into the interior of the electronic device 200. In some embodiments, the ledge 212 can be integrally formed as part of the enclosure 202. Alternatively, in other embodiments, the ledge 212 is connected or affixed to the enclosure 202 using any suitable attachment mechanism. For example, the ledge 212 can be affixed to the enclosure 202 using an adhesive, one or more mechanical attachments such as a screw, or by welding the ledge 212 to the enclosure 202.

In some embodiments, the flexible sensor 210 can seal the space or the junction between the top surface of the ledge 212 and the bottom surface of the cover layer 208. In one embodiment, the flexible sensor 210 is a continuous flexible sensor that extends completely around the internal perimeter of the cover layer 208 (see e.g., flexible sensor 300 in FIG. 3). In another embodiment, the flexible sensor 210 can be one or more discrete flexible sensors that are situated at select locations around the internal periphery of the cover layer 208 and/or within the electronic device 200.

The flexible sensor 210 can include any suitable circuitry or components that support the operations and functionality of the flexible sensor 210. In a non-limiting example, the flexible sensor 210 is a force sensor that includes a first set of input-sensing elements 214 and a second set of input-sensing elements 216. In one embodiment, the first and the second sets of input-sensing elements 214, 216 each include one or more electrodes. The one or more electrodes in the first set of input-sensing elements 214 can be formed within the first substrate layer 218 or on a surface of the first substrate layer 218. Similarly, the one or more electrodes in the second set of input-sensing elements 216 can be formed within a second substrate layer 220 or on a surface of the second substrate layer 220. In one non-limiting example, the first and the second substrate layers 218, 220 can each be a flexible printed circuit. Those skilled in the art will appreciate that different types of substrate layers can be used in other embodiments.

Each electrode in the first set of input-sensing elements 214 is aligned in at least one direction (e.g., vertically) and paired with a respective electrode in the second set of input-sensing elements 216 such that each pair of electrodes forms a capacitor. The flexible sensor 210 is configured to produce changes in capacitance based on force inputs applied to the cover layer 208. The capacitance of one or more capacitors in the flexible sensor 210 may vary when a force is applied to the cover layer 208. A processing device (not shown) operably connected to the flexible sensor 210 can correlate the changes in capacitance to an amount of force (or to changes in force). The user can apply the force to the cover layer 208 with a body part (e.g., a finger) or with an input device, such as a stylus.

The flexible sensor 210 can be configured to detect a different type of user input in addition to, or as an alternative to, force inputs. For example, the flexible sensor 210 may be constructed to detect touch inputs instead of force inputs based on capacitance changes. In such embodiments, one set of input-sensing elements (e.g., input-sensing elements 216) can be omitted from the flexible sensor 210. In another embodiment, one set of input-sensing elements (e.g., input-sensing elements 216) can include one electrode that functions as a reference plane (e.g., a ground plane) and/or that shields the other set of input-sensing elements (e.g., input-sensing elements 214) from electrical interference.

In other embodiments, the flexible sensor 210 can be constructed with different circuitry and/or components. For example, the flexible sensor 210 can be implemented as an optical displacement sensor, a piezoelectric force sensor, or an ultrasonic touch sensor. In such embodiments, the flexible sensor 210 includes the appropriate type(s) of input-sensing elements. For example, the first and/or the second set of input-sensing elements 214, 216 can be ultrasonic transducers when the flexible sensor 210 is configured as an ultrasonic touch sensor.

A compliant layer 222 is positioned between the first and the second substrate layers 218, 220. The compliant layer 222 is configured to provide elastic compression or deformation to the flexible sensor 210 based on user inputs (e.g., a force input) applied to the cover layer 208. Additionally, in the illustrated embodiment, the compliant layer 222 is a dielectric for the one or more capacitors that are formed by the pairs of electrodes in the first and the second sets of input-sensing elements 214, 216.

The compliant layer 222 includes first and second compliant materials 224, 226 (e.g., different compressible or deformable materials). As described earlier, one compliant material (e.g., the second compliant material 226) is more deformable or compressible than the other compliant material (e.g., first compliant material 224). In some embodiments, the spring constant of the second compliant material 226 is less than the spring constant of the first compliant material 224. The first and the second compliant materials 224, 226 can each be formed with any suitable compressible or deformable material(s). In one example, the first compliant material 224 may be made of a polymer material (e.g., silicone) and the compliant material 226 can be air. In other embodiments, the first compliant material 224 may be made of a polymer material (e.g., silicone) and the compliant material 226 can be formed with a gel or a foam.

In some embodiments, when the second compliant material 226 is air, a gap may be formed in one or more sections of the first compliant material 224. The gap can be a partial gap that does not extend from the first substrate layer 218 to the second substrate layer 220. For example, the second compliant material 226 may extend from the second substrate layer 220 to a point (e.g., a midpoint) within the first compliant material 224. Alternatively, the second compliant material 226 can reside within a gap that is formed within the first compliant material 224 and does not extend to the first and the second substrate layers 218, 220 (e.g., a hole in the first compliant material 224).

As discussed in more detail in conjunction with FIGS. 5A-7, because the second compliant material 226 is more deformable or compressible than the first compliant material 224, at least one of the first and/or the second substrate layers 218, 220 in the flexible sensor 210 can be bent, twisted, shaped, or otherwise manipulated in the section or sections that include the second compliant material 226. This manipulation may permit the flexible sensor 210 to fit or conform along one or more contoured surfaces. As described earlier, a contoured surface can include two or more sections of the surface that abut one another at a non-zero angle.

Additionally or alternatively, the first and the second compliant materials 224, 226 provide the flexible sensor 210 with different sensitivities or responsiveness to a user input, such as a force input. For example, because the second compliant material 226 is more compressible or deformable than the first compliant material 224, the section(s) of the flexible sensor 210 that include the second compliant material 226 are more sensitive or responsive to a force input. The section(s) that include the second compliant material 226 respond to force inputs that have relatively smaller magnitudes of force because the sections(s) are more easily displaced (e.g., compressed or deformed). Thus, the section(s) of the flexible sensor 210 that include the second compliant material 226 can be used to detect a greater range of force inputs compared to the section(s) of the bendable or flexible sensor 210 that include the first compliant material 224.

Figure 8:
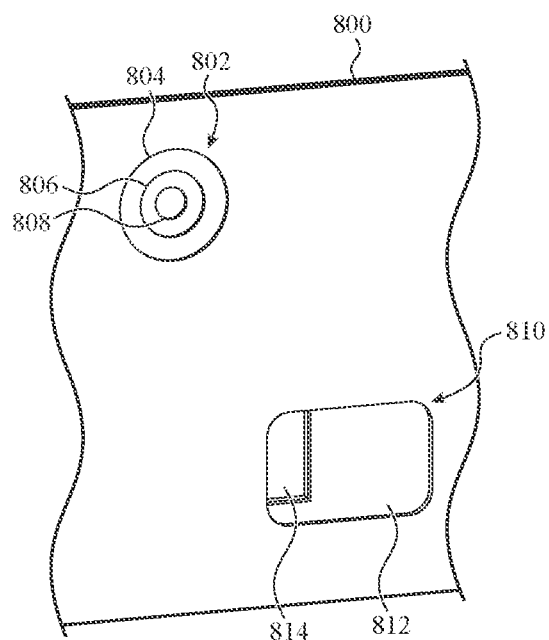
FIG. 8 shows example gaps in a compliant layer.

Additionally, as will be described in more detail in conjunction with FIG. 8, the section or sections of the flexible sensor 210 that include the second compliant material 226 can be shaped or patterned to complement the contours of one or more components in the electronic device 200. In a non-limiting example, the flexible sensor 210 may be shaped such that the surface of the flexible sensor 210 is substantially planar when the flexible sensor 210 rests on a physical component (e.g., an electrical, mechanical, and/or structural component).

The flexible sensor 210 is attached to the cover layer 208 and to the ledge 212 using adhesive layers 228, 230, respectively. The first adhesive layer 228 is positioned between the second substrate layer 220 and the bottom surface of the cover layer 208. The second adhesive layer 230 is positioned between the first substrate layer 218 and the top surface of the ledge 212. Any suitable adhesive material can be used in the first and the second adhesive layers 228, 230. In one embodiment, the first and the second adhesive layers 228, 230 are pressure sensitive adhesive layers.

When the flexible sensor 210 is used as a force sensor, one substrate layer (e.g., the first substrate layer 218) is used as a drive layer that is configured to transmit drive signals to the electrode(s) in the first set of input-sensing elements 214. The other substrate layer (e.g., the second substrate layer 220) is used as a sense layer that is configured to receive sense signals from the electrode(s) in the second set of input-sensing elements 216. A processing device (e.g., processing device 1604 in FIG. 16) is configured to receive the sense signals and correlate the capacitances of the pairs of electrodes (represented by the sense signals) to an amount of force.

Figure 3:
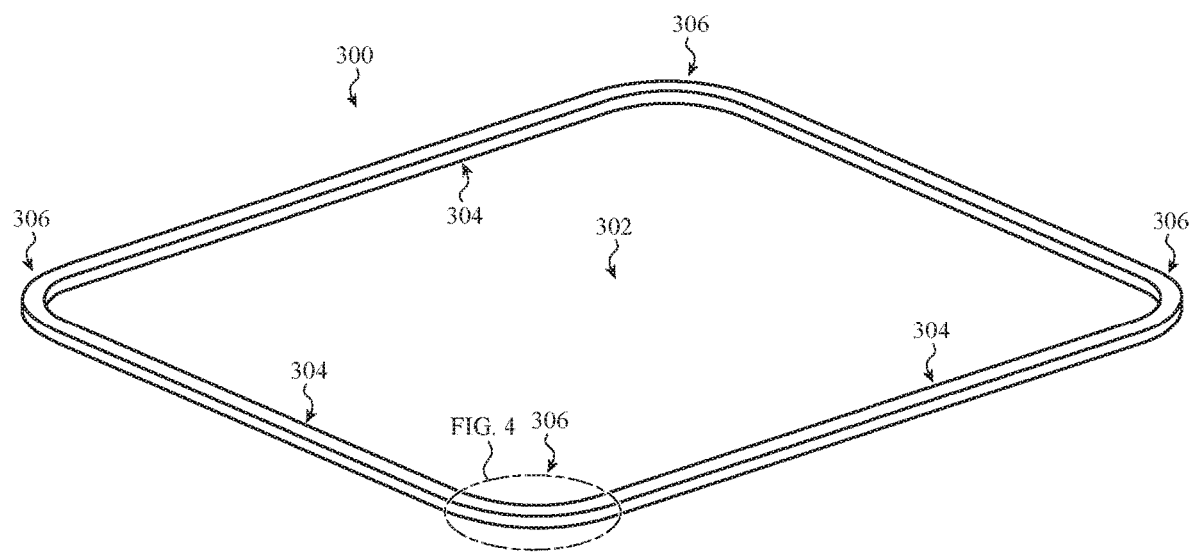
FIG. 3 shows another example of a flexible sensor that is suitable for use in the electronic device shown in FIG. 1.

FIG. 3 shows another example of a flexible sensor that is suitable for use in the electronic device shown in FIG. 2A. The flexible sensor 300 is configured as a continuous bendable or flexible sensor that extends completely around the internal periphery of the enclosure 202 or the cover layer 208. As described earlier, the flexible sensor 300 can be arranged differently in other embodiments. For example, the flexible sensor 300 may be situated under and around the periphery of an enclosure (e.g., enclosure 202 in FIG. 2A). In some embodiments, the flexible sensor 300 can be configured into one or more discrete flexible sensors that each may be positioned at select locations within an electronic device (e.g., electronic device 200 in FIG. 2A).

In the illustrated embodiment, an opening 302 is formed between the inside edges 304 of the flexible sensor 300. The opening is positioned within the enclosure of the electronic device 200 (e.g., the area inside the perimeter of the enclosure). The corners 306 of the flexible sensor are rounded or bent to allow the flexible sensor 300 to conform to the shape of the internal perimeter of the enclosure 202.

Figure 4:
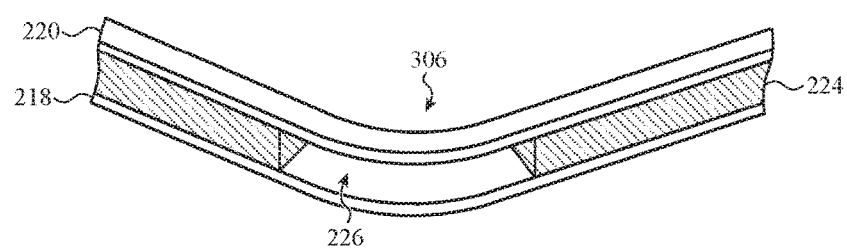
FIG. 4 depicts an expanded view of a rounded corner in the flexible sensor shown in FIG. 3.

FIG. 4 depicts an expanded view of a rounded corner of the flexible sensor 300. Each rounded corner 306 of the flexible sensor 300 includes the more deformable or compressible second compliant material 226. As described earlier, the flexible sensor 300 is able to bend, twist, or otherwise be manipulated in the section or sections of the flexible sensor 300 that include the second compliant material 226. In the illustrated embodiment, the dimensions and locations of the second compliant material 226 in the flexible sensor 300 permit the flexible sensor 300 to bend in at least two dimensions at the corners 306.

The straighter sections or sides of the flexible sensor 300 include the first compliant material 224. The first and the second substrate layers 218, 220 (e.g., flexible circuits) are situated on respective sides of the first and the second compliant materials 224, 226. Because the first compliant material 224 is less deformable or compressible than the second compliant material 226, the first compliant material 224 may provide some support to the flexible sensor 300. Additionally, in some situations, the first compliant material 224 may be displaced into the second compliant material 226 in response to a user input (e.g., an applied force).

In some embodiments, a bonding structure (see the bonding structure 1210 in FIG. 12) can be affixed to the first and the second substrate layers 218, 220 at the transitions between the first and the second compliant materials 224, 226. The bonding structure can reduce shear in the first compliant material 224 when the flexible sensor 300 is bent, twisted, or otherwise manipulated. In other words, the bonding structure can increase the resistance of the first compliant material 224 to shear forces when the flexible sensor 300 is bent, twisted, or otherwise manipulated. Additionally or alternatively, the bonding structure may improve the contouring and bend performance of the flexible sensor.

Figure 5A:
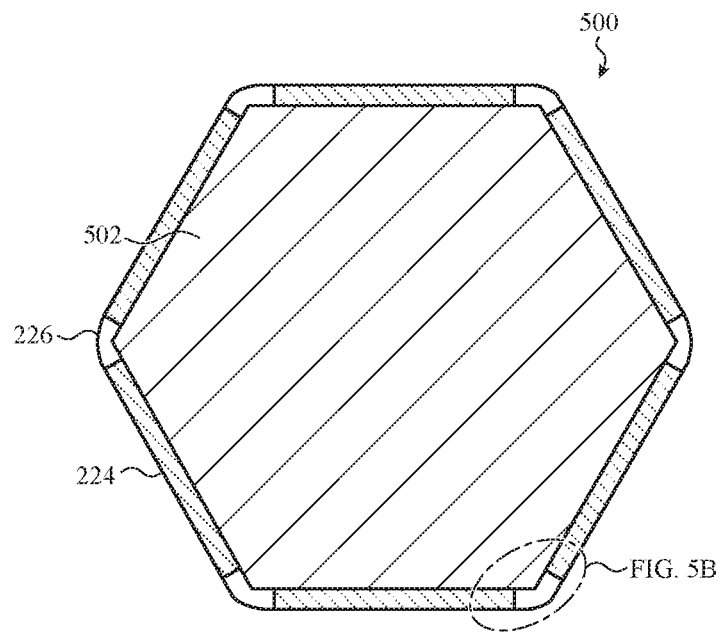
FIG. 5A shows a flexible sensor positioned along a perimeter of a physical component.

FIG. 5A shows a flexible sensor positioned along a perimeter of a physical component. The physical component 502 can be any suitable electronic component, mechanical component, structural component, or combinations thereof. Although the physical component 502 is illustrated as having a hexagonal shape, other embodiments are not limited to this form. The physical component 502 can have any three-dimensional size, shape and contours.

The flexible sensor 500 includes sections that have the first compliant material 224 and sections that have the second compliant material 226 (FIG. 2B). The sections that include the second compliant material 226 are bendable to allow the flexible sensor 500 to conform to the shape of the physical component 502. In particular, the first and/or the second substrate layers 218, 220 in the sections of the flexible sensor 500 that include the second compliant material 226 bend along the corners of the physical component 502.

In other embodiments, the flexible sensor 500 can be configured to fit in areas that do not include physical components (e.g., electrical components, structural components, and/or mechanical components). In other words, the flexible sensor 500 may be bent, shaped, twisted, or otherwise manipulated to fit into open or accessible areas (areas that are absent any physical components). In still other embodiments, the flexible sensor 500 can be bent, shaped, twisted, or otherwise manipulated to fit into areas that include physical components and are absent of physical components.

Figure 5B:
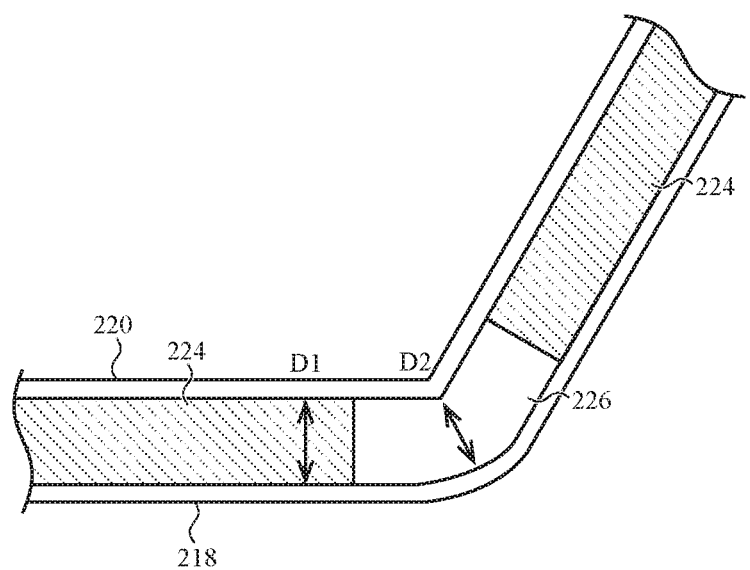
FIG. 5B depicts an expanded view of a rounded corner in the flexible sensor shown in FIG. 5A.

FIG. 5B shows a side view of the rounded corner shown in FIG. 5A. In the rounded corner, the second substrate layer 220 moves closer to the first substrate layer 218. In particular, the first and/or the second substrate layers 218, 220 are separated by a first distance D1 in the sections that include the first compliant material 224 and separated by a shorter distance D2 in the rounded corner. In some embodiments, the shorter distance D2 can impact sensor signals obtained from the input-sensing elements in the rounded corner. For example, when the flexible sensor is a force sensor and the input-sensing elements are electrodes that form capacitors in the flexible sensor 300, the shorter distance D2 can affect the baseline capacitance values of the capacitors in the rounded corner. The baseline capacitance values are the values when the flexible sensor 300 is in a rest state and a force is not applied to, or near, the rounded corner. In some embodiments, the effects of the shorter distance D2 can be compensated for based on the known distances D1 and D2. Compensation values that account for the different baseline capacitance values can be determined.

When a force is applied to a rounded corner, the first substrate layer 218 and the second compliant material 226 deform or compress. In response to the compression or deformation, the distance D2 changes (e.g., becomes shorter), which varies the capacitance of the capacitor(s) associated with the rounded corner. The amount of the distance change is based on the magnitude of the applied force and the spring constant of the second compliant material 226. Sense signals received from the capacitor(s) represent the capacitance values of the capacitors. The magnitude of the applied force can be determined using the sense signals and the compensation values to adjust for the different baseline capacitance values.

As described earlier, the first and the second compliant materials (e.g., 224, 226 in FIG. 2B) may provide a flexible sensor with different sensitivities or responsiveness to a user input, such as a force input. Since one compliant material is more compressible or deformable than the other compliant material, the section(s) of a flexible force sensor that include the more compressible or deformable compliant material respond to force inputs that have relatively smaller magnitudes of force. Thus, these sections can be used to detect a greater range of force inputs compared to the section(s) of the flexible sensor that include the less compressible or deformable compliant material.

Figure 6:
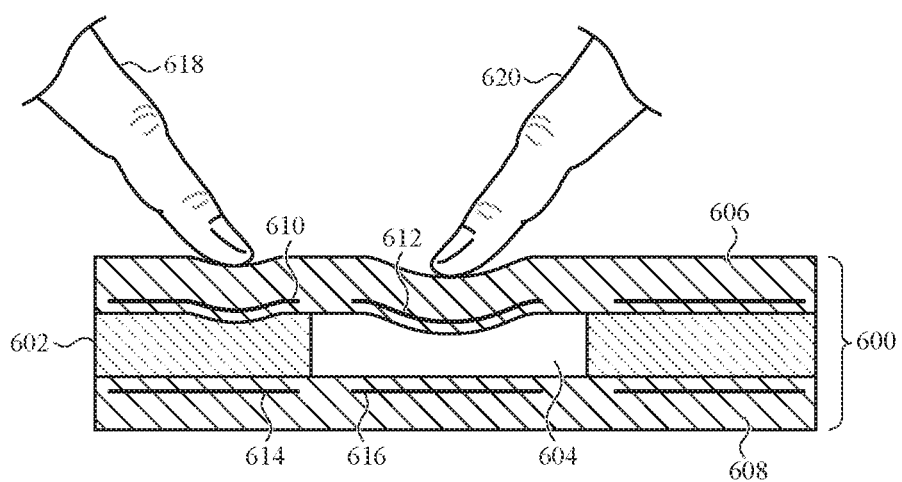
FIG. 6 shows an example flexible sensor that is configured as two force sensors having different sensitivities to force inputs.

FIG. 6 depicts an example flexible sensor that is configured as two force sensors having different sensitivities to force inputs. The flexible sensor 600 includes a first compliant material 602 and a second compliant material 604 positioned between a first flexible circuit 606 and a second flexible circuit 608. The first compliant material 602 is less deformable or compressible than the second compliant material 604. In some embodiments, the spring constant of the second compliant material 604 is less than the spring constant of the first compliant material 602. In one non-limiting embodiment, the first compliant material 602 is formed with silicone and the second compliant material 604 is a gap or unfilled space in a section of the first compliant material 602; the gap may have air therein. Insofar as the air is not constrained within the gap, the spring constant of the gap may be zero, or may be dependent only on the spring constants of the flexible circuits.

The first flexible circuit 606 includes electrodes 610, 612 and the second flexible circuit 608 includes electrodes 614, 616. The electrodes 610, 614 are aligned vertically to form a first capacitor. When a user presses on (e.g., applies a force input with finger 618) the flexible sensor 600 over the electrode 610, the first flexible circuit 606, the electrode 610, and the first compliant material 602 are displaced (e.g., deform or compress). It should be noted that in other embodiments, a user may press on an input surface (e.g., cover layer 208) and the applied force is transferred to, and detected by, the flexible sensor 600.

In response to the displacement, a distance between the electrodes 610, 614 changes by a first amount (e.g., distance becomes shorter), which varies the capacitance of the first capacitor. The amount of the distance change between the electrodes 610, 614 is based on the amount of force applied by the user and the spring constant of the first compliant material 602. In some embodiments, the first compliant material 602 may be displaced into the second compliant material 604 in response to the applied force.

Similarly, the electrodes 612, 616 are aligned vertically to form a second capacitor. When a user presses on (e.g., applies a force input with finger 620) the flexible sensor 600 over the electrode 612, the first flexible circuit 606, the electrode 612, and the second compliant material 604 are displaced (e.g., deform or compress). In response to the compression or deformation, a distance between the electrodes 612, 616 changes by a second amount (e.g., becomes shorter), which varies the capacitance of the second capacitor. The amount of the distance change between the electrodes 612, 616 is based on the amount of force applied by the user and the spring constant of the second compliant material 604.

Because the second compliant material 604 is more deformable or compressible than the first compliant material 602, the spring constant of the second compliant material 604 is less than the spring constant of the first compliant material 602. Accordingly, when the applied force has the same magnitude, the capacitance of the second capacitor will vary more than the capacitance of the first capacitor because the distance between the electrodes 612, 616 will change more compared to the distance between the electrodes 610, 614. In other words, the second capacitor is more sensitive to applied forces than the first capacitor. Thus, the second capacitor can detect forces that have smaller magnitudes compared to the first capacitor, which allows the second capacitor to detect a greater range of force magnitudes.

Figure 7:
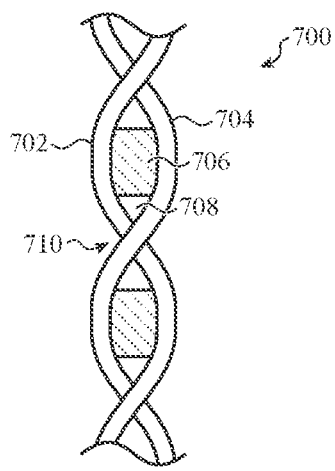
FIG. 7 depicts another example flexible sensor.

FIG. 7 shows another example flexible sensor. The flexible sensor 700 includes a first flexible circuit or substrate layer 702 and a second flexible circuit or substrate layer 704. Positioned between the first and the second substrate layers 702, 704 are a first compliant material 706 and a second compliant material 708. The second compliant material 708 is more deformable or compressible than the first compliant material 706. As described earlier, any suitable deformable or compliant material can be used in the first and the second compliant materials 706, 708. In one non-limiting embodiment, the first compliant material 706 is formed with silicone and the second compliant material 708 is air (e.g., a gap between the first and the second substrate layers 702, 704).

Because the second compliant material 708 is more deformable or compressible than the first compliant material 706, the first and/or the second substrate layers 702, 704 in the sections of the flexible sensor 700 that include the second compliant material 708 are more bendable, flexible, and/or shapeable than the first and/or the second substrate layers 702, 704 in the sections that include the first compliant material 706. In the illustrated embodiment, the first and the second substrate layers 702, 704 in the sections of the flexible sensor 700 that include the second compliant material 708 are capable of being bent to a point where the first and the second substrate layers 702, 704 are twisted or rotated about each other (see section 710). Thus, in some embodiments, the flexible sensor 700 is configured to be shaped into a helical or spiral configuration.

The first and the second substrate layers 702, 704 can each include one or more input-sensing elements. For example, in one embodiment the first substrate layer 702 includes electrodes that are paired with respective electrodes in the second substrate layer 704, the capacitors formed by the electrode pairs can be used to detect the amounts of force that are applied to the first substrate layer 702 and/or to the second substrate layer 704. As described earlier, since the capacitors in the sections that include the second compliant material 708 are more responsive or sensitive to applied forces, the capacitors in the sections that include the second compliant material 708 can detect a greater range of force magnitudes. The capacitors in the sections that include the second compliant material 708 can detect relatively small magnitudes of force up to larger magnitudes of force compared to the sections that include the first compliant material 706.

Additionally, the capacitors can be used to detect the amount of twist in the first and the second substrate layers 702, 704 in the flexible sensor 700. As the flexible sensor 700 bends or twists at the sections that include the second compliant material 708, the first and the second substrate layers 702, 704 move closer together, which varies the capacitances of the capacitors in the sections that include the second compliant material 708. A processing device (not shown) can receive sense signals from the capacitors and correlate the sense signals into an amount of force.

Additionally, the distance or area between the first and the second substrate layers 702, 704 can be determined based on the known spring constants of the first and the second compliant materials 706, 708. The radius of the curves in the first and the second substrate layers 702, 704 may be calculated based on known trigonometry principles.

Like the embodiment shown in FIGS. 2, 4, and 5B, a bonding structure (see the bonding structure 1210 in FIG. 12) can be affixed between the first and the second substrate layers 702, 704 at the transitions between the first and the second compliant materials 706, 708. The bonding structure can reduce shear in the first compliant material 706 when the flexible sensor 700 is twisted. Additionally or alternatively, the bonding structure may improve the contouring and bend performance of the flexible sensor 700.

As described earlier, one or more sections of a compliant layer can be patterned or shaped to complement the contours in one or more surfaces or physical components in an electronic device. FIG. 8 depicts example gaps in a compliant layer. The compliant layer 800 includes a first gap 802 that is configured as concentric circles 804, 806, 808. Each circle 804, 806, 808 is formed by removing a different amount of compliant material such that each circle 804, 806, 808 has a different depth compared to the other circles 804, 806, 808. For example, the first circle 808 may have a greater depth than the second circle 806, and the second circle 806 may have a greater depth than the third circle 804 (or vice versa).

One or more of the first, the second, and the third circles 804, 806, 808 may or may not extend through the compliant layer 800 to form an opening in the compliant layer 800. In other words, the first, second, and third circles 804, 806, 808 may each be partial gaps or unfilled spaces that do not produce an opening through the compliant layer 800. Alternatively, one or more of the first, second, and third circles 804, 806, 808 may produce an opening through the compliant layer 800.

The compliant layer 800 also includes a second gap 810 that is formed with two gaps 812, 814. The first and second gaps 812, 814 have different shapes and different depths. For example, the first gap 812 is depicted as a rectangle with rounded corners and the second gap 814 is located within the first gap 812 (e.g., along two edges of the first gap 812). In the illustrated embodiment, the second gap 814 can have a different amount of compliant material that is removed compared to the first gap 812 such that the second gap 814 has a greater depth than the first gap 812. The second gap 814 may or may not extend through the compliant layer 800 to form an opening through the compliant layer 800.

Figure 9:
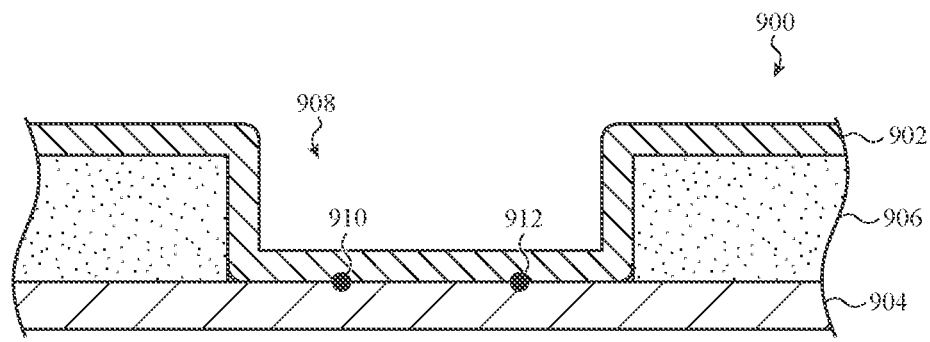
FIG. 9 depicts a first interconnect assembly in a patterned compliant layer of a flexible sensor.

In some embodiments, one or more physical components (e.g., electrical, structural, and/or mechanical components) can be situated in one or more unfilled spaces in a compliant layer. FIG. 9 shows a first interconnect assembly in a compliant layer of a flexible sensor. The flexible sensor 900 includes a first substrate layer or flexible circuit 902 and a second substrate layer or flexible circuit 904. A first compliant material 906 and a second compliant material 908 are positioned between the first and the second flexible circuits 902, 904.

The second compliant material 908 is a gap or unfilled space that is positioned between sections of the first compliant material 906. The first flexible circuit 902 extends into the unfilled space to contact the second flexible circuit 904. One or more electrical connections 910, 912 are formed between the second flexible circuit 904 and the section of the first flexible circuit 902 that is positioned in the unfilled space.

Figure 10:
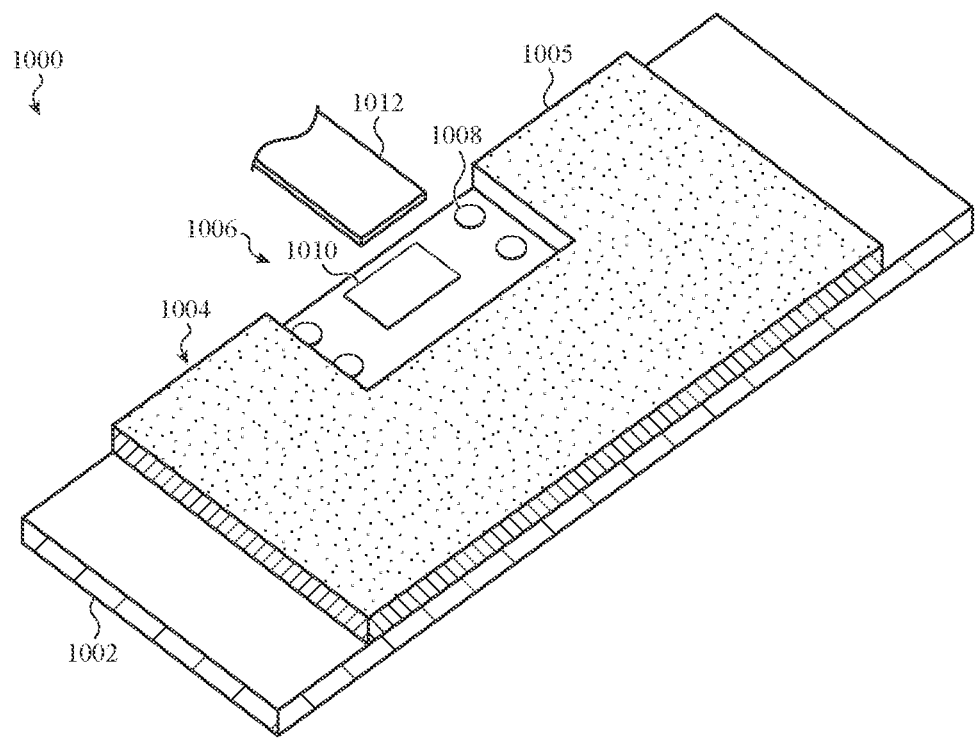
FIG. 10 shows a second interconnect assembly in a patterned compliant layer of a flexible sensor.

FIG. 10 depicts a second interconnect assembly in a compliant layer of a flexible sensor. The flexible sensor 1000 includes a first substrate layer (not shown) and a second substrate layer 1002. The first substrate layer is omitted in FIG. 10 for clarity. A compliant layer 1004 is positioned between the first substrate layer and the second substrate layer 1002. The compliant layer 1004 includes a first compliant material 1005 and a second compliant material 1006. In the illustrated embodiment, the second compliant material 1006 is a gap or unfilled space that is formed in a section of the first compliant material 1005.

As described earlier, one or more input-sensing elements may be included in the first substrate layer and/or the second substrate layer 1002. In one embodiment, one or more electrodes can be situated in the first substrate layer and/or the second substrate layer 1002. As described earlier, the electrodes can be used to detect force and/or touch inputs.

In some embodiments, one or more physical components may be included in the unfilled space (e.g., the second compliant material 1006). The physical component(s) can be electrical components, mechanical components, and/or structural components. For example, one or more electrical contacts 1008 can reside in the gap or unfilled space and be coupled to the second substrate layer 1002 (e.g., a flexible circuit). Example electrical contacts 1008 include, but are not limited to, test points, interconnects, and capacitive sensing pads.

Additionally, one or more electrical circuits 1010 (e.g., an integrated circuit) may be situated in the unfilled space and coupled to one or both of the first substrate layer or the second substrate layer 1002. In some instances, a flexible circuit 1012 can couple to the electrical circuit 1010 to transmit signals to and/or from the electrical circuit 1010. For example, in one embodiment, the electrical circuit 1010 may be a processing device that is configured to receive signals from the input-sensing elements in the first substrate layer and/or in the second substrate layer 1002.

In some embodiments, the first substrate layer can extend over and cover the second compliant material 1006 (e.g., unfilled space). In other embodiments, the first substrate layer is shaped, or a portion of the first substrate layer is removed, so at least a portion of the second compliant material 1006 (e.g., unfilled space) is exposed.

Figure 11:
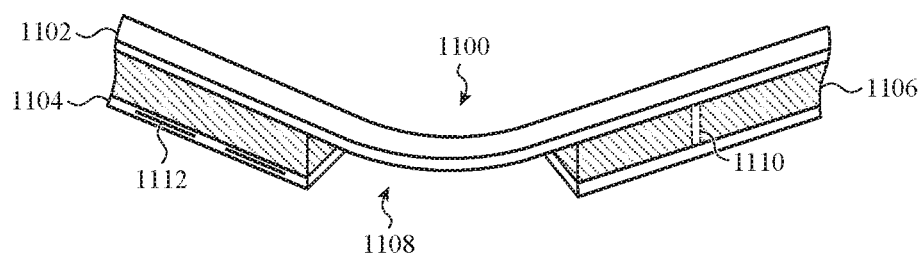
FIG. 11 depicts another example of a flexible sensor.

FIG. 11 shows another example of a flexible sensor. The flexible sensor 1100 includes a first flexible circuit 1102 and a second flexible circuit 1104. Positioned between the first and the second flexible circuits 1102, 1104 is a first compliant material 1106 and a second compliant material 1108 (e.g., a gap). The second compliant material 1108 is more deformable or compressible compared to the first compliant material 1106. Only the first flexible circuit 1102 is positioned over the second compliant material 1108. The second flexible circuit 1104 is positioned below the first compliant material 1106 but not the second compliant material 1108.

The flexible sensor 1100 is configured to be bent, twisted, or otherwise manipulated in the section that includes the second compliant material 1108. In particular, at least one of the first or the second flexible circuit 1102, 1104 is configured to be bent, twisted, or otherwise manipulated in the section that includes the second compliant material 1108. Additionally, the flexible sensor 1100 is configured to detect user inputs, such as force inputs and/or touch inputs. As such, the first flexible circuit 1102 and the second flexible circuit 1104 can both include input-sensing elements, such as electrodes. As described earlier, the capacitor(s) formed by the electrodes detect force inputs based on capacitance values (or changes in capacitance values).

In some embodiments, one or more vias 1110 may be formed through the first compliant material 1106. An electrical connector (not shown) can reside in the via(s) 1110 and electrically connect the first flexible circuit 1102 to the second flexible circuit 1104.

In some implementations, the flexible sensor 1100 may be configured to detect touch inputs using only one or more input-sensing elements 1112. For example, the input-sensing element(s) 1112 can be electrodes that detect touch inputs through self-capacitive sensing. For example, a conductive object (e.g., a finger) on an input surface (e.g., cover layer 208 in FIG. 2A), as well as the location of the conductive object on the input surface, can be detected by the electrode(s) in the second flexible circuit 1104.

Like the embodiment shown in FIGS. 2, 4, 5B, and 7, a bonding structure (see the bonding structure 1210 in FIG. 12) can be affixed between the first and the second flexible circuits 1102, 1104 at the transitions between the first and the second compliant materials 1106, 1108. The bonding structure can increase the resistance of the first compliant material 1106 to shear forces when the flexible sensor 1100 is bent, twisted, or otherwise manipulated. Additionally or alternatively, the bonding structure may improve the contouring and bend performance of the flexible sensor 1100.

Figure 12:
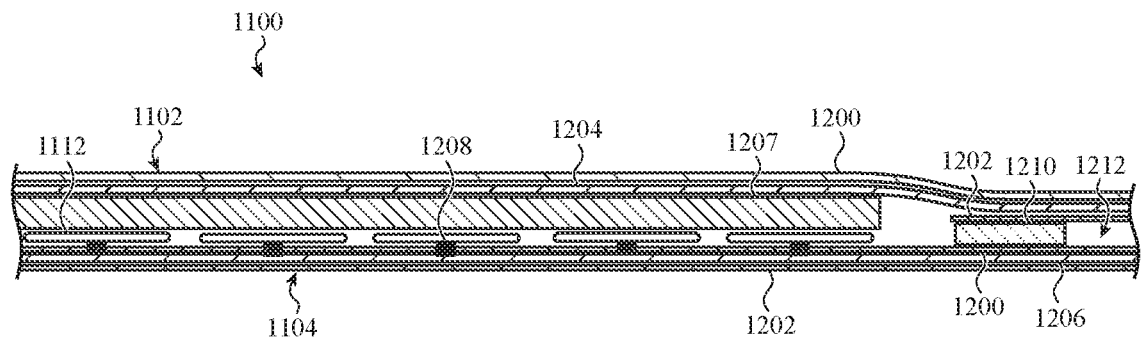
FIG. 12 shows a side view of a portion of another example of a flexible sensor 1.

FIG. 12 shows a side view of a portion of another example of a flexible sensor. In the illustrated embodiment, the first flexible circuit 1102 includes a stack of three layers; a first shield layer 1200, a second shield layer 1202, and drive or ground shield traces 1204 positioned between the first and second shield layers 1200, 1202. Similarly, the second flexible circuit 1104 includes a stack of three layers; the first shield layer 1200, the second shield layer 1202, and sense or ground shield traces 1206 positioned between the first and second shield layers 1200, 1202.

A first compliant material 1207 is positioned between the first and second flexible circuits 1102, 1104. A second compliant material 1212 is more deformable or compressible than the first compliant material 1207. In some embodiments, the spring constant of the second compliant material 1212 is less than the spring constant of the first compliant material 1207. The one or more input-sensing elements 1112 are positioned between the first compliant material 1207 and the second flexible circuit 1104. Contacts 1208 provide an electrical connection between the sense and ground shield traces 1206 and the input-sensing element(s) 1112. A bonding structure 1210 is affixed between the first and the second flexible circuits 1102, 1104 at the transitions between the first and the second compliant materials 1207, 1212. The bonding structure 1210 can reduce shear in the first compliant material 1207 when the flexible sensor 1100 (e.g., the first and/or the second flexible circuit 1102, 1104) is bent, twisted, or otherwise manipulated.

Additionally, the size and dimensions of the sections that include the second compliant material 1212 and/or the transitions between the first compliant material 1207 and the second compliant material 1212 may permit the sensitivity and stiffness of the flexible sensor 1100 to be tuned to a given sensitivity and/or stiffness, or set within a given sensitivity range and/or stiffness range. The sections in the flexible sensor 1100 that include the second compliant material 1212 (which provide a lower stiffness to the flexible sensor 1100) can increase the resistance to shear forces and/or improve the contouring and bend performance of the flexible sensor 1100.

Figure 13:
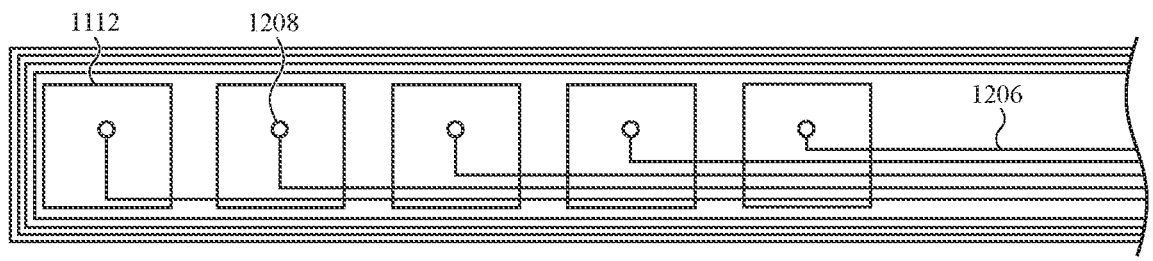
FIG. 13 depicts a bottom view of the portion of the flexible sensor shown in FIG. 12.

FIG. 13 depicts a bottom view of the portion of the flexible sensor shown in FIG. 12. The second shield layer 1202 is omitted for clarity. The sense or ground shield traces 1206 couple to respective input-sensing elements 1112 via contacts 1208. Sense signals are received from the input-sensing elements 1112 through the sense or ground shield traces 1206. Alternatively, a reference signal (e.g., a ground voltage) can be applied to the input-sensing elements) 1112 via the sense or ground shield traces 1206.

As described in conjunction with FIGS. 2 and 6, some embodiments include one or more input-sensing elements in both the first and the second flexible circuits or substrate layers. In such embodiments, the electrical contacts to the input-sensing elements in the first flexible circuit or substrate layer can be implemented similar to the electrical contacts shown in FIG. 13.

Figure 14:
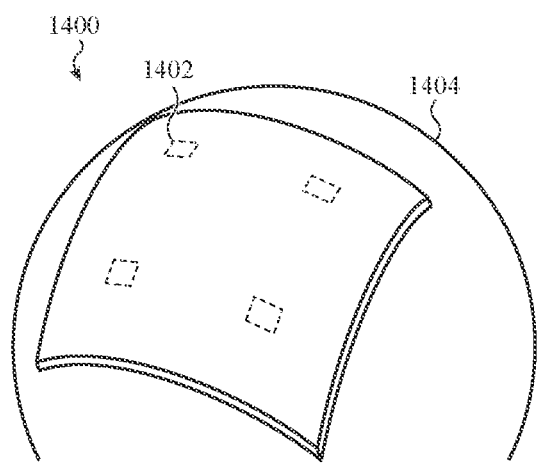
FIG. 14 shows another example of a flexible sensor.

FIG. 14 shows another example of a flexible sensor. The flexible sensor 1400 includes partial gaps 1402 that permit the flexible sensor 1400 to conform to the contoured surface of the physical component 1404. The dimensions and locations of the partial gaps 1402 are selected to permit the flexible sensor 1400 to be shaped (e.g., bent) in three dimensions to conform to the surface of the physical component 1404. Although only four partial gaps are shown in FIG. 14, other embodiments can include any number of partial gaps. Additionally, the flexible sensor 1400 may include one or more gaps (non-partial gaps) that extend through the flexible sensor 1400.

Figure 15:
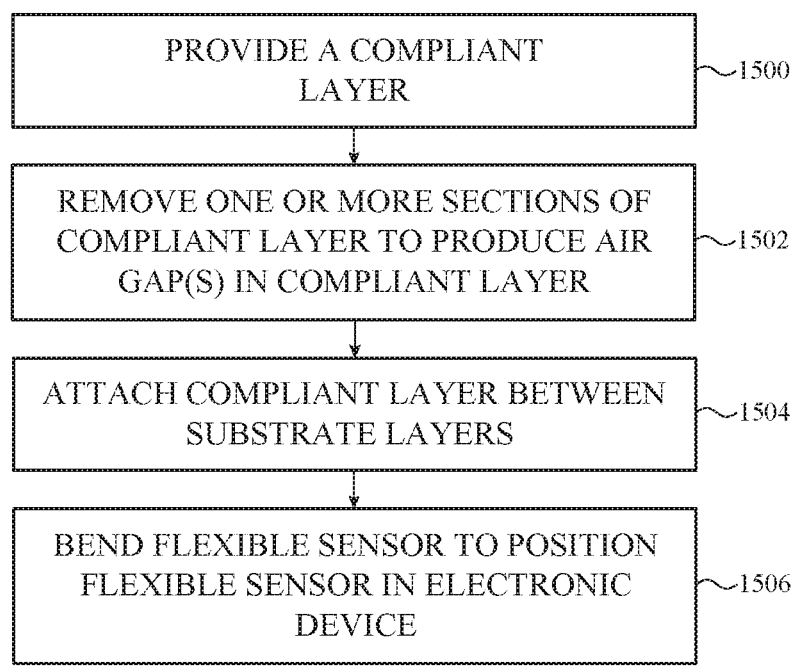
FIG. 15 depicts a flowchart of a method of producing a flexible force sensor for an electronic device.

FIG. 15 shows a flowchart of a method of producing a flexible force sensor for an electronic device. The process is described in conjunction with a single flexible sensor. Initially, a compliant layer is provided at block 1500. One or more sections of the compliant layer are then removed to produce unfilled spaces or gaps in the compliant layer (block 1502). The unfilled spaces or gaps can be created in sections where the first and the second substrate layers or flexible circuits will be bent, twisted, or otherwise manipulated so the flexible sensor conforms to a contoured surface and/or to fit in an accessible area or areas of an electronic device (e.g., areas where physical components or surfaces are absent).

Additionally or alternatively, the gaps may be formed at select locations to produce a given performance of the flexible sensor. In some situations, the transitions between the first compliant material and the unfilled spaces permit the sensitivity and stiffness of the flexible sensor to be tuned to a given sensitivity and/or stiffness, or set within a given sensitivity range and/or stiffness range. Defining sections of the flexible sensor to have reduced stiffness provides resistance to shear and/or provides improved contouring and bend performance.

Any suitable method may be used to form the gaps in the compliant layer. Example methods include, but are not limited to, machining out sections of the compliant layer, laser cutting the compliant layer, etching the compliant layer, and/or manually removing sections of the compliant layer.

Next, as shown in block 1504, the compliant layer may be positioned between and attached to two substrate layers to produce a flexible sensor. One or both substrate layers can include input-sensing elements. Example input-sensing elements include, but are not limited to, electrodes, strain gauges, piezoelectric structures, ultrasonic transducers, optical emitters and detectors, and the like.

The flexible sensor is then positioned in an electronic device at block 1506. The substrate layers in the flexible sensor may be bent, twisted, or otherwise manipulated to conform to a surface of a physical component and/or to be situated in an area that does not include any physical components. In some instances, the flexible sensor is arranged in the electronic device to allow a user input to bend, twist, or otherwise manipulate (or further bend, twist, or manipulate) the flexible sensor.

In some embodiments, the method can be used to produce multiple flexible sensors. For example, a roll-to-roll process can be used to produce multiple flexible sensors. A sheet of compliant material can be processed to form gaps in the sheet of compliant material. The gaps may be produced by machining out sections of the sheet of compliant material, laser cutting the sheet of compliant material, etching the sheet of compliant material, manually removing sections of the sheet of compliant material, and so on. The processed sheet of compliant layer may then be bonded to two sheets of substrate layers or flexible circuits to produce a flexible sensor sheet. Individual flexible sensors may then be formed by cutting or singulating the flexible sensor sheet.

Alternatively, in other embodiments, the sheet of compliant material is bonded to one sheet of a first substrate layer prior to the formation of the gaps. Thereafter, the gaps are formed in the sheet of compliant material. A sheet of a second substrate layer is then affixed to the processed sheet of compliant material to produce a flexible sensor sheet. Individual flexible sensors may then be formed by cutting or singulating the flexible sensor sheet.

The compliant layer may be a sheet of compliant material that is subsequently cut or singulated to form individual compliant layers for multiple flexible sensors. As discussed earlier, after the gaps are formed in the sheet of compliant material, the sheet of compliant material can be singulated to form individual compliant layers for multiple flexible sensors.

Figure 16:
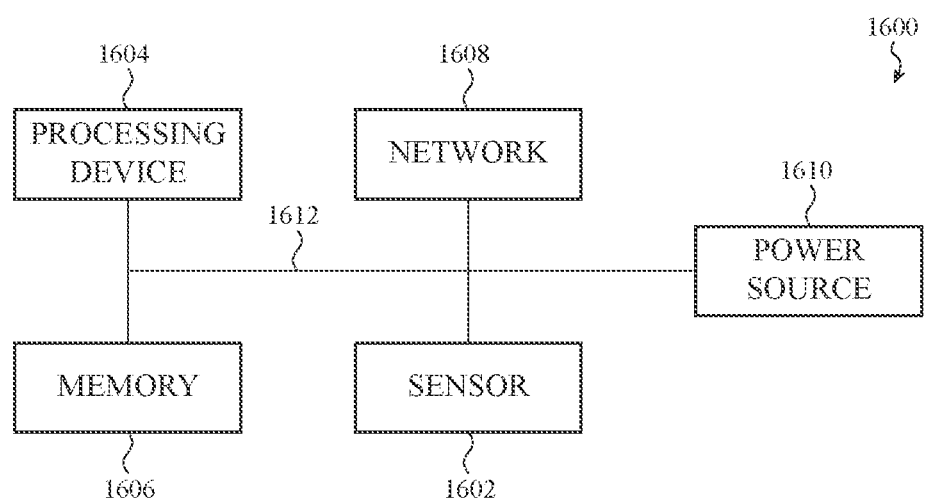
FIG. 16 shows a block diagram of an electronic device that includes at least one flexible sensor.

FIG. 16 shows a block diagram of an electronic device that includes at least one flexible sensor. The electronic device 1600 includes one or more flexible sensors 1602, one or more processing devices 1604, memory 1606, one or more network interfaces 1608, and a power source 1610, each of which will be discussed in turn below.

The one or more flexible sensors 1602 can be configured to sense or detect substantially any type of user input. Example user inputs include, but are not limited to, touch inputs and/or force inputs. Accordingly, the flexible sensor(s) 1602 can include any suitable type of input-sensing element. For example, the input-sensing elements can be one or more electrodes that are included in one or both of the first and the second flexible circuits or substrate layers of at least one flexible sensor 1602. In some embodiments, the flexible sensor(s) are configured as one or more of the example flexible sensors shown in FIGS. 2-14.

The one or more processing devices 1604 can control some or all of the operations of the electronic device 1600. The processing device(s) 1604 can communicate, either directly or indirectly, with substantially all of the components of the electronic device 1600. For example, one or more system buses 1612 or other communication mechanisms can provide communication between the processing device(s) 1604, the flexible sensor(s) 1602, the memory 1606, the network interface 1608, and/or the power source 1610. In some embodiments, the processing device(s) 1604 can be configured to receive output or sense signals from the flexible sensor(s) 1602 and determine at least one characteristic of a user input based on the output or sense signals. For example, when a flexible sensor is configured as a capacitive force sensor, the processing device(s) 1604 may receive sense signals from the capacitive force sensor and correlate the sense signals to a force magnitude.

The processing device(s) 1604 can be implemented as any electronic device capable of processing, receiving, or transmitting data or instructions. For example, the one or more processing devices 1604 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 1606 can store electronic data that can be used by the electronic device 1600. For example, the memory 1606 can store electrical data or content such as, for example, audio files, document files, timing and control signals, spring constants for the first and second compliant materials (e.g., the first and second compliant materials 224, 226 in FIG. 2B), compensation values (e.g., see FIG. 4B), location data of the first and second compliant materials, and so on. The memory 1606 can be configured as any type of memory. By way of example only, memory 1606 can be implemented as random access memory, read-only memory, Flash memory, removable memory, or other types of storage elements, in any combination.

The network interface 1608 can receive data from a user or one or more other electronic devices. Additionally, the network interface 1608 can facilitate transmission of data to a user or to other electronic devices. The network interface 1608 can receive data from a network or send and transmit electronic signals via a wireless or wired connection. For example, the one or more characteristics of a user input that are determined by the processing device(s) 1604 can be transmitted to another electronic device.

Examples of wireless and wired connections include, but are not limited to, cellular, Wi-Fi, Bluetooth, and Ethernet. In one or more embodiments, the network interface 1608 supports multiple network or communication mechanisms. For example, the network interface 1608 can pair with another device over a Bluetooth network to transfer signals to the other device while simultaneously receiving signals from a Wi-Fi or other wired or wireless connection.

The one or more power sources 1610 can be implemented with any device capable of providing energy to the electronic device 1600. For example, the power source 1610 can be a battery. Additionally or alternatively, the power source 1610 can be a wall outlet that the electronic device 1600 connects to with a power cord. Additionally or alternatively, the power source 1610 can be another electronic device that the electronic device 1600 connects to via a wireless or wired connection (e.g., a connection cable), such as a Universal Serial Bus (USB) cable.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A bendable force sensor configured to detect a force input, comprising:
   a first flexible circuit comprising a first electrode;
   a second flexible circuit comprising a second electrode, the first and second electrodes configured to detect the force input based on a change in capacitance;

a first compliant member positioned between the first and second flexible circuits in a first region of the bendable force sensor, the first region of the bendable force sensor extending along a first surface of an electronic device; and a second compliant member positioned between the first and second flexible circuits in a second region of the bendable force sensor, the second region of the bendable force sensor extending along a second surface of the electronic device, the second region oriented at a non-zero angle relative to the first region; wherein:

the first and second compliant members define a gap between the first and second flexible circuits in a third region of the bendable force sensor, the third region of the bendable force sensor extending along a third, non-planar surface of the electronic device and positioned between the first and second regions of the bendable force sensor;

the first and second flexible circuits are configured to bend along the third region allowing the bendable force sensor to conform to the third, non-planar surface of the electronic device;

in response to the force input, the first flexible circuit is configured deflect toward the third, non-planar surface of the electronic device; and in response to the deflection of the first flexible circuit, the bendable force sensor is configured to detect the force input.

2. The bendable force sensor of claim 1, wherein:
the first compliant member is positioned between the first and second electrodes the first flexible circuit comprises a third electrode; and
the second flexible circuit comprises a fourth electrode; wherein:
the gap is positioned between the third and fourth electrodes.

3. The bendable force sensor of claim 1, wherein the gap is positioned between the first and second electrodes.

4. The bendable force sensor of claim 3, wherein at least one of the first flexible circuit or the second flexible circuit bends and twists at the gap and the first and second electrodes are configured to detect a magnitude of the twist.

5. The bendable force sensor of claim 1, further comprising at least one of:
an electrical contact pad positioned in the gap and electrically connected to at least one of the first flexible circuit or the second flexible circuit; or
an electrical circuit positioned in the gap and electrically connected to the at least one of the first flexible circuit or the second flexible circuit.

6. The bendable force sensor of claim 1, wherein:
the gap is a first gap having a first width; and
the bendable force sensor further comprises a second gap having a different second width, the first and second gaps permitting the bendable force sensor to conform to the third, non-planar surface of the electronic device.

7. An electronic device, comprising:
a component; and
a bendable sensor coupled to the component, the bendable sensor comprising:
a first substrate layer comprising a first set of electrodes;
a second substrate layer comprising a second set of electrodes; and
a compliant layer positioned between the first substrate layer and the second substrate layer, the compliant layer comprising:

a first compliant member positioned between the first and second sets of electrodes in a first region of the bendable sensor extending along a first surface of the component and formed of a first compliant material having a first spring constant;

a second compliant member positioned between the first and second sets of electrodes in a second region of the bendable sensor extending along a second surface of the component, the second region oriented at a non-zero angle relative to the first region, the second compliant member formed from the first compliant material; and a second compliant material positioned between the first and second sets of electrodes in a third region of the bendable sensor that is positioned between the first and second regions and having a second spring constant lower than the first spring constant, wherein:

the bendable sensor is configured to bend along the third region of the bendable sensor that includes the second compliant material to conform to a non-planar shape;

the bendable sensor is configured to bend along the first region to a lesser degree than along the second region;

in response to an applied force, the first substrate layer is configured to deform along the third region of the bendable sensor; and the bendable sensor is configured to estimate an amount of the applied force based on the deformation of the first substrate layer.

8. The electronic device of claim 7, wherein the first and second sets of electrodes are configured to detect a touch input.

9. The electronic device of claim 8, wherein the first and the second sets of electrodes are configured to detect the applied force.

10. The electronic device of claim 9, wherein the first and second sets of electrodes form a capacitor that is configured to detect the applied force.

11. The electronic device of claim 7, wherein the component comprises an enclosure of the electronic device and the bendable sensor is adjacent to and extending along an internal surface of the enclosure.

12. The electronic device of claim 7, wherein the second compliant material comprises a gap formed between the first and second substrate layers.

13. The bendable force sensor of claim 1, wherein the first surface is a planar surface of the electronic device.

14. The bendable force sensor of claim 13, wherein the second region of the bendable force sensor is positioned along a second planar surface of the electronic device.

15. The bendable force sensor of claim 13, wherein:
the gap is a first gap;
the second, nonplanar surface is a first curved surface;
the bendable force sensor further defines a fourth region defining a second gap between the first and second flexible circuits; and
the fourth region is positioned along a second curved surface of the electronic device.

16. The bendable force sensor of claim 1, wherein:
the first flexible circuit comprises a first capacitive layer comprising the first electrode;
the second flexible circuit comprises a second capacitive layer comprising the second electrode; and the first compliant member, the second compliant member, and the gap are positioned between the first and second capacitive layers.

17. The electronic device of claim 7, wherein the first and second substrate layers are configured to bend along the third region to a lesser degree than along the second region.

18. The electronic device of claim 17, wherein:
the second compliant material comprises a first gap formed between the first and second substrate layers;
the electronic device further comprises a second gap formed between the first and second substrate layers in a fourth region of the bendable sensor, the first region between the second region and the fourth region; and
the first and second substrate layers are configured to bend along the fourth region of the bendable sensor to conform to a curvature of the component.

19. The electronic device of claim 7, wherein the second compliant material is air.

* * * * *